United States Patent Office 2,695,328
Patented Nov. 23, 1954

2,695,328

SOFTENING OF RUBBER

Charles Edwin Kendall, Castle Bromwich, Birmingham, England, assignor to Dunlop Rubber Company Limited, London County, England, a British company No Drawing. Application June 30, 1951, Serial No. 234,652

5 Claims. (Cl. 260—761)

This invention relates to methods of softening rubber.

It is known that mastication of unvulcanized rubber softens it by effecting depolymerisation, i. e. rupture of the carbon chain of the molecule into fragments of shorter chain length whereby a diminution in the mean molecular weight of the rubber is effected. When rubber which has been softened in this way is dissolved the resulting solutions are less viscous than solutions of the same concentration of rubber which has not been depolymerised. It is also known that certain compounds, for example organic peroxides and certain sulphur-containing compounds, e. g. alkyl and aryl mercaptans, increase the rate at which depolymerisation occurs on mastication. Hereinafter compounds capable of increasing the rate of depolymerisation of rubber on mastication are referred to as depolymerisation promoters. Depolymerisation of rubber by mastication with an organic peroxide or with one or more of the sulphur-containing depolymerisation promoters requires a prolonged milling operation to produce rubber which gives a mobile solution containing as little as 5% by weight of rubber, and it is not practicable by such a method so to treat rubber that solutions containing more than about 20% by weight of rubber are obtained which can be poured. It is probable that depolymerisation is not uniform throughout the mass of rubber on the mill, for in many cases although the masticated rubber is sticky to the touch on the surface, indicating considerable depolymerisation, the viscosity of the solutions produced from the rubber is higher than would be expected if all the rubber were in a sticky condition, indicating the presence of rubber which has not been greatly depolymerised.

Proposals have also been made to depolymerise rubber by treatment in solution or in aqueous dispersion with oxygen or oxidizing agents.

I have found that a more rapid and uniform depolymerisation of unvulcanized rubber can be effected by treating the rubber with a per-compound in the presence of an unsaturated sulphur-containing compound, particularly a sulphur-containing compound used as a depolymerisation promoter.

According to the invention, therefore, a process for softening unvulcanized rubber comprises treating the rubber with a per-compound in the presence of an unsaturated sulphur-containing compound.

Preferably the per-compound is an organic peroxide or hydroperoxide. Depolymerisation may be effected by masticating the rubber with a per-compound and the unsaturated sulphur-containing compound or by subjecting the rubber to the action of these compounds by adding the latter to a solution or to an aqueous dispersion of the rubber.

The per-compound may be added to the rubber in an amount of from 0.02% to 10%, and preferably in an amount of from 0.1% to 5%, by weight of the rubber, the amount of the sulphur compound depending upon the conditions of treatment of the rubber and on the per-compound selected. Suitable amounts of the unsaturated sulphur-containing compound which may be used are from 0.02% to 10%, preferably from 0.1% to 5%, based on the weight of rubber. Preferably the weight of the per-compound is greater than that of the unsaturated sulphur-containing compound. With a given amount of a particular per-compound there appears to be an optimum amount of the sulphur compound, since with either more or less than this amount softening does not proceed as far in a given time.

When the depolymerisation is effected by masticating the rubber the per-compound selected should be miscible with the rubber, and when it is effected in solution the per-compound should be soluble or dispersible in the solution. When rubber is treated in aqueous dispersion the per-compound should be soluble or dispersible in water, and it should not cause coagulation of the rubber. For treatment by mastication or in solution there may be used alkyl hydroperoxides, e. g. tertiary butyl hydroperoxide or cumene hydroperoxide, or acyl peroxides, e. g. acetyl peroxide or benzoyl peroxide. If treatment is effected in aqueous dispersion, hydrogen peroxide or the above-mentioned organic hydroperoxides and organic peroxides may be used, and also water-soluble per-salts, e. g. ammonium persulphate.

Unsaturated sulphur-containing compounds which may be used in conjunction with the per-compounds include thiocarbonyl compounds whose thiocarbonyl carbon atom is directly linked to two nitrogen atoms or tautomers of these compounds. The use of these compounds as depolymerisation promoters is described and claimed in Patent No. 2,631,177 of March 10, 1953. Examples of these compounds are acyclic compounds of the type

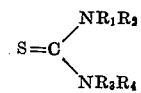

where $R_1$, $R_2$, $R_3$ and $R_4$ are hydrogen atoms or alkyl groups, e. g. thiourea and N,N'-diethylthiourea and heterocyclic compounds of the types

especially where the thiocarbonyl carbon atom forms part of a five- or six-membered ring, e. g. thiouracil, 1,2-hydrobenzimidazole-2-thione, 1,2-dihydroimidazole-2-thione and ethylene thiourea.

1,2-hydrobenzimidazole-2-thione is a tautomer of a mercapto-benzimidazole, the tautomerisic form being the same compound.

Other unsaturated sulphur-containing compounds which may be used in accordance with the invention include aryl and heterocyclic mercaptans, e. g. thiophenol and batanaphthyl mercaptan; acyclic compounds of the type

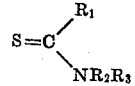

and tautomeric forms thereof where $R_1$ is a hydrocarbon group and $R_2$ and $R_3$ are hydrogen atoms or hydrocarbon groups, e. g. thiacetamide and alphanaphthyl-thiacetamide; heterocyclic compounds of the type

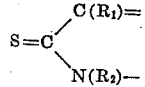

and tautomeric forms thereof where $R_1$ and $R_2$ are hydrogen atoms or hydrocarbon groups, e. g. =S (usually given the name of its tautomer, quinoline-2-thiol); heterocylic compounds of the type

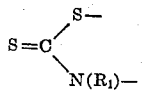

and tautomers thereof where $R_1$ is a hydrogen atom or a hydrocarbon group, e. g. mercaptothiazole and mercaptobenzthiazole; and acyclic compounds of the type

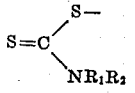

and tautomers thereof where $R_1$ and $R_2$ are hydrogen atoms or hydrocarbon groups, e. g. methyl dimethyldithiocarbamate, sodium diethyldithiocarbamate and zinc diethyldithiocarbamate.

In one method of carrying out the invention rubber is softened by adding the per-compound and the unsaturated sulphur-containing compound to rubber on a roller mill or other masticating apparatus, and mastication is effected at an elevated temperature, e. g. 50° to 200° C., for a suitable time depending on the degree of depolymerisation desired. Mastication may be effected, for example, using 0.1% to 5% by weight of an alkyl hydroperoxide and 0.1% to 5% by weight of mercaptobenzimidazole at a temperature of 50° C. to 150° C.; with the above-mentioned materials and conditions of mastication the time of treatment may be as little as two minutes or as much as one hour, according to whether a product is required suitable for compounding with vulcanising agents and other materials for the production of vulcanised moulded articles or whether a considerably depolymerised product is desired, for example a product suitable for the manufacture of adhesives.

Depolymerisation of the rubber may also be effected by dissolving a per-compound and an unsaturated sulphur-containing compound in a solution of the rubber in a suitable solvent, e. g. benzene or carbon tetrachloride, and allowing the solution to stand for one hour or longer at ordinary temperatures, or heating it for a shorter time. If desired the rubber may then be recovered from solution or it may be left in solution and the solution used, e. g., for the production of adhesives. Alkyl hydroperoxides are suitable per-compounds to use, and the unsaturated sulphur-containing compound may be mercaptobenzimidazole; for example an amount of the former of from 0.02% to 10% and of the latter of from 0.02% to 5%, both calculated on the weight of the rubber, may be used.

Aqueous dispersions of rubber, e. g. a concentrated natural latex, may also be treated in a similar way to depolymerise the rubber therein, or rubber may be depolymerised by adding the per-compound and the unsaturated sulphur-containing compound to the latex and coagulating the rubber therein, during which step at least part of the reagents will become occluded in the rubber, and the coagulated rubber may then be left at ordinary temperatures for depolymerisation to proceed. In the treatment of rubber in aqueous dispersion, the per-compound may be hydrogen peroxide or tertiary butyl hydroperoxide and the unsaturated sulphur-containing compound may be mercaptobenzimidazole or thiourea. Thus 0.02% to 10% of hydrogen peroxide (in the form of a solution containing 30 parts by weight of pure $H_2O_2$ per 100 parts by weight of solution) may be used with 0.02% to 5% of mercaptobenzimidazole or 0.02% to 10% of tertiary butyl hydroperoxide with 0.02% to 5% of thiourea, the percentages being in each case based on the weight of the rubber in the dispersion. Depending on the concentration of the unsaturated sulphur-containing compound used, products closely resembling normal masticated rubber or highly degraded, almost liquid, products may be made. The normal mastication on a mill or in a Banbury mixer can thus be omitted.

By subjecting the rubber to the action of a per-compound in the presence of an unsaturated sulphur-containing compound a very much more rapid depolymerisation results than if the per-compound or the sulphur-containing compound were absent, and it is economically feasible to depolymerise rubber so far that solutions containing as much as 20% by weight of the rubber can be obtained which are less viscous than glycerol at the same temperture. Thus for example a 10% solution of smoked sheet rubber in benzene containing 7% by weight based on the rubber of tertiary butyl hydroperoxide shows no appreciable change in viscosity on standing at room temperature for several weeks, nor does a 10% solution of the smoked sheet rubber in benzene containing 2% on the rubber of mercaptobenzimidazole; on the other hand if 5% of tertiary butyl hydroperoxide and 2% of mercaptobenzimidazole (each percentage based on the rubber) are added to such a solution of rubber in benzene the viscosity falls from an initial viscosity of the order of 90 poises to a viscosity of less than 1 poise on standing for 24 hours. Qualitatively similar results are obtained with other pairs of per-compounds and unsaturated sulphur-containing compounds.

It also appears that depolymerisation by mastication is more uniform as a softened rubber can be obtained which is hardly sticky but gives a solution with lower viscosity than rubber masticated with the unsaturated sulphur-containing compound alone until its surface is sticky. Nevertheless the rubber is tacky in the sense that two pieces of the softened rubber adhere well when pressed together.

The following examples illustrate the invention all parts and percentages being by weight, unless otherwise stated.

*Example 1*

To a solution of unmasticated rubber in benzene containing 10% of rubber there was added tertiary butyl hydroperoxide in an amount corresponding to 5% of the rubber and mercaptobenzimidazole in an amount corresponding to 2% of the rubber; the solution was left to stand, and the depolymerisation of the rubber was observed by periodically measuring the viscosity of the solution. Initially the viscosity was 89 poises but after 24 hours it was 0.49 poise.

*Example 2*

To a concentrated natural rubber latex containing 60% rubber there was added tertiary butyl hydroperoxide in an amount corresponding to 5% of the rubber and mercaptobenzimidazole in an amount corresponding to 2% of the rubber. The latex was cast into a number of thin layers which were allowed to dry for 24 hours. The resultant rubber films became increasingly tacky on standing in air for two weeks.

The progressive depolymerisation of the rubber in each film was observed by applying a constant tensile stress to each film for 5 minutes (the stress being the same on each occasion), and noting the extension produced. The following are the mean extensions observed.

After 7 days_____ 60% of the original length.
After 13 days_____ 136% of the original length.
After 21 days_____ 244% of the original length.

*Example 3*

To a concentrated natural rubber latex containing 60% rubber there was added 1% of 30% aqueous hydrogen peroxide and 1% of mercaptobenzimidazole (each based on the rubber in the latex), and the latex was allowed to stand at room temperature for 24 hours. Rubber films were cast from the latex and allowed to dry for 24 hours. A constant tensile stress was then applied to a number of the films for 5 minutes to extend them, and the mean of the extensions then observed was 112% of the original length. When rubber films were cast in the same way from untreated latex and tested under the same constant stress for the same time the mean extension observed was 48%, thus indicating that the rubber in the films cast from the treated latex had been depolymerised.

*Example 4*

A natural rubber latex was treated as in Example 3 using 1% of tertiary butyl hydroperoxide and 1% of thiourea instead of the hydrogen peroxide and mercaptobenzimidazole respectively, and rubber films were cast from the latex. When tested by the method of Example 3 the mean of the extensions of the films was 110%.

*Example 5*

Smoked sheet rubber was masticated on a mill at 50° C. for 7 minutes with 0.25% of mercaptobenzimidazole and 0.25% of tertiary butyl hydroperoxide, each based on the smoked sheet. The rubber was then dissolved in benzene to give a 10% weight for volume solution. The viscosity of the solution (measured in poises) was only 3.8% of that of a solution of unmasticated rubber of the same concentration in the same solvent.

*Example 6*

To a solution of unmasticated rubber in benzene containing 10% of rubber there was added 5% of tertiary butyl hydroperoxide and 2% of thioacetamide, the percentage of each being calculated on the rubber. The viscosity of the solution was initially 89 poises; after standing at room temperature for 2 days its viscosity was reduced to 1.3 poises.

*Example 7*

A concentrated natural rubber later containing 60% rubber solids had its pH value adjusted to 8 and a similar amount of tertiary butyl hydroperoxide and mercaptobenzimidazole as in Example 2 were added. A thin film of this latex was cast and left to dry in air for 3 days.

The dry film was very tacky and suitable for use as an adhesive.

*Example 8*

A 5% solution of rubber in benzene was made up and was divided into 11 equal portions. In the table shown below 2% of tertiary butyl hydroperoxide (containing 60% pure C$_4$H$_9$OOH) based on the rubber was added to each of nine portions of the rubber solution as indicated; to each of nine portions of the rubber solution an amount of an unsaturated sulphur-containing compound equivalent to ⅓ molecule of the compound per molecule of pure C$_4$H$_9$OOH was added. All the solutions were kept at approximately 20° C. in closed vessels which had been sealed in air so that small amounts of oxygen were available. After 5 days of standing in air the viscosity of each solution was determined.

| Whether or not peroxide added | Compound added | Viscosity in poises at 20° C. |
|---|---|---|
| No | None | 750 |
| Yes | do | 750 |
| No | Mercaptobenzimidazole | 750 |
| Yes | Mercaptobenzthiazole | 560 |
| Yes | Mercaptothiazole | 49 |
| Yes | Sodium diethyldithiocarbamate | 39 |
| Yes | Zinc diethyldithiocarbamate | 22.8 |
| Yes | Mercaptobenzimidazole | 15.7 |
| Yes | Thiourea | 10.2 |
| Yes | Thiophenol | 0.46 |
| Yes | Ethylenethiourea | 0.13 |

It will be seen from the above table that unless both the peroxide and an unsaturated sulphur-containing compound were present no reduction in the viscosity of the rubber solutions occurred.

The rubber recovered from the solutions varied from a product having properties similar to those of rubber masticated in the usual manner to viscous liquids.

*Example 9*

A 5% solution of rubber in toluene was made up as before and divided into 13 equal portions. To 12 of these portions of rubber solution 5% tertiary butyl hydroperoxide (containing 60% of pure C$_4$H$_9$OOH) based on the rubber was added together with a quantity of one of the unsaturated sulphur-containing compounds shown below equivalent to ⅓ molecule of the compound per molecule of pure C$_4$H$_9$OOH. To the 13th portion of rubber solution no peroxide or unsaturated sulphur-containing compound was added. The viscosity of each solution was determined after standing in air for 5 days at approximately 20° C.

| Whether or not peroxide added | Compound added | Viscosity in poises at 20° C. |
|---|---|---|
| No | None | 220 |
| Yes | Dithio-oxamide | 184 |
| Yes | Thiobarbituric acid | 118 |
| Yes | Thiosemicarbazide | 115 |
| Yes | Diphenylthiourea | 15 |
| Yes | Phenylthiosemicarbazide | 12.3 |
| Yes | Di-ortho-tolyl thiourea | 11.6 |
| Yes | Phenylthiourea | 5.0 |
| Yes | Mercaptobenzimidazole | 2.8 |
| Yes | Alphanaphthylthiacetamide | 1.64 |
| Yes | Allyl thiourea | 0.37 |
| Yes | Ethyl thiourea | 0.18 |
| Yes | Ethylenethiourea | 0.06 |

Having described my invention what I claim is:
1. A process for softening unvulcanized rubber comprising treating the rubber with a per-compound selected from the group consisting of organic peroxide, hydrogen peroxide and water soluble per-sulphate in the presence of a depolymerization promoter which is a sulphur-containing compound containing the group

2. A process according to claim 1 wherein the per-compound is an organic peroxide.
3. A process for softening unvulcanized rubber comprising treating the rubber with a per-compound selected from the group consisting of organic peroxide, hydrogen peroxide and water soluble per-sulphate in the presence of a depolymerization promoter which is a heterocyclic compound containing the group

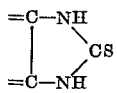

the per-compound and the depolymerization promoter being each present in an amount of from 0.02% to 10% by weight of the rubber.
4. A process according to claim 3 wherein the depolymerization promoter is ethylene thiourea and the per-compound and the depolymerization promoter are each present in an amount of from 0.1% to 5% by weight of the rubber.
5. The process of claim 1 in which the depolymerization promoter and the per-compound are each present in amount from 0.02% to 10% by weight of rubber.

References Cited in the file of this patent

UNITED STATES PATENTS

| Number | Name | Date |
|---|---|---|
| 1,490,073 | Shepard et al. | Apr. 8, 1924 |
| 2,064,580 | Williams et al. | Dec. 15, 1936 |
| 2,190,587 | Williams et al. | Feb. 13, 1940 |
| 2,206,448 | Busse et al. | July 2, 1940 |
| 2,332,401 | Roblin | Oct. 19, 1943 |

FOREIGN PATENTS

| Number | Country | Date |
|---|---|---|
| 637,594 | Great Britain | May 24, 1950 |
| 637,604 | Great Britain | May 24, 1950 |